United States Patent [19]

Advolotkin et al.

[11] Patent Number: 4,496,868
[45] Date of Patent: Jan. 29, 1985

[54] ELECTRICAL MACHINE

[75] Inventors: Nikolai P. Advolotkin; Svetlana A. Belyaeva; Igor E. Ovchinnikov; Nikolai I. Lebedev; Alexei J. Yankovsky; Stanislav P. Sytykh; Jury A. Khrenov; Vladimir N. Axenov, all of Leningrad, U.S.S.R.

[73] Assignee: Vsesojuzny Nauchno-Issledovatelsky Institut Elektromashinostroenia, Leningrad, U.S.S.R.

[21] Appl. No.: 486,181

[22] Filed: Apr. 18, 1983

[51] Int. Cl.$^3$ .............................................. H02K 7/20
[52] U.S. Cl. ...................................... 310/112; 310/42; 310/58; 310/165; 310/258
[58] Field of Search ............... 310/112, 178, 114, 165, 310/166, 154, 181, 162, 163, 89, 254, 46, 257, 171, 258, 159, 64, 42, 58, 59, 152, 194; 322/13

[56] References Cited

U.S. PATENT DOCUMENTS

| | | | |
|---|---|---|---|
| 1,780,150 | 11/1930 | Ahlm | 310/112 |
| 3,401,281 | 9/1968 | Martin | 310/43 |
| 3,437,854 | 4/1969 | Olso | 310/254 |
| 3,495,112 | 2/1970 | Kurakin | 310/181 |
| 3,534,204 | 10/1970 | Groezinger | 310/165 |
| 3,534,205 | 10/1970 | O'Ornano | 310/258 |
| 3,553,508 | 1/1971 | Stcherbatcheff | 310/181 |
| 3,684,906 | 8/1972 | Lenz | 310/64 |
| 3,743,873 | 7/1973 | de Jong | 310/165 |
| 4,323,803 | 4/1982 | Danko | 310/64 |
| 4,385,251 | 5/1983 | Mallick | 310/178 |

FOREIGN PATENT DOCUMENTS 1016364 9/1957 Fed. Rep. of Germany ...... 310/112

OTHER PUBLICATIONS

All-Union Research Institute "Electromash.", No. 76, No. 78070366, p. 2, FIG. 1b; 1978.
Edward L. Lustenader, Robert H. Guess, Eike Richter, and Fred G. Turnbull, IEEE Transactions on Vehicular Technology, vol. VT-26, No. 2, May 1977, "Development of a Hybrid Flywheel/Battery Drive System for Electric Vehicle Applications", pp. 135-143.

Primary Examiner—R. Skudy
Attorney, Agent, or Firm—Lilling & Greenspan

[57] ABSTRACT

An electrical machine comprising a cylindrical housing accommodating a rotor made in the form of at least two pole systems having pole projections and interconnected through a magnetic circuit, a stator having at least two stacks of laminations, and an excitation system. The excitation system is mounted on the outside of the housing and composed of magnetically conductive and nonmagnetic portions arranged alternately in an axial direction, with a respective stator stack secured to each of the magnetically conductive portions of the housing.

8 Claims, 28 Drawing Figures

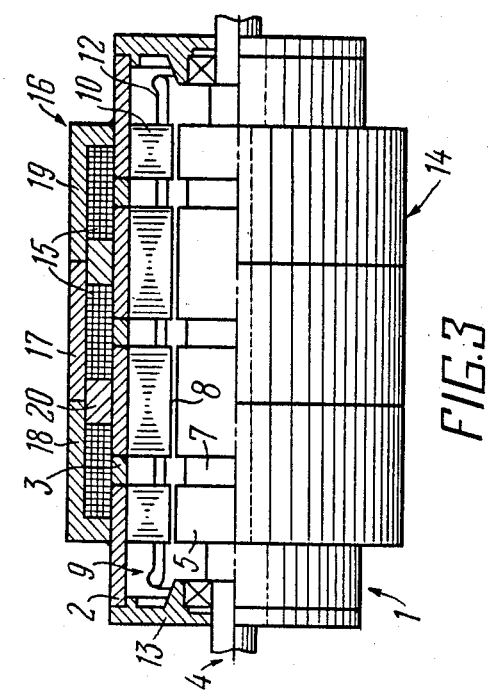
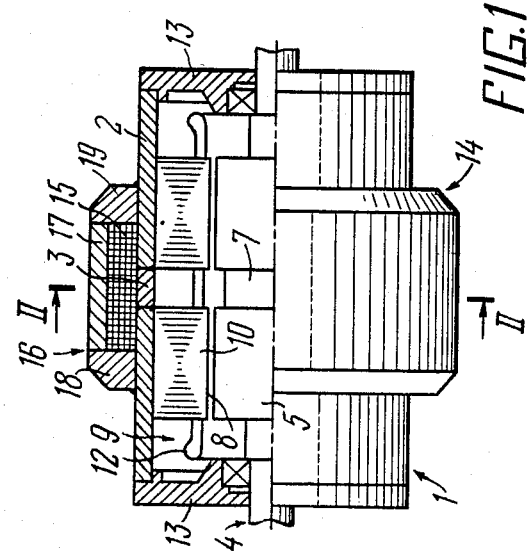

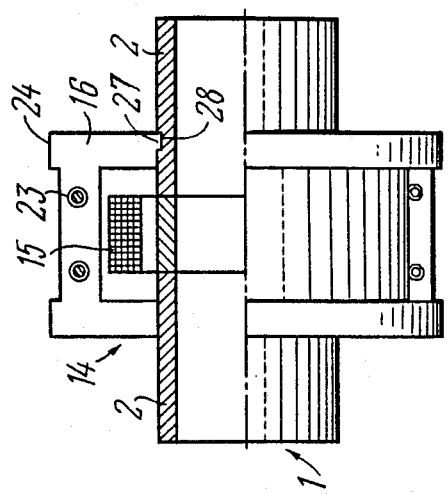
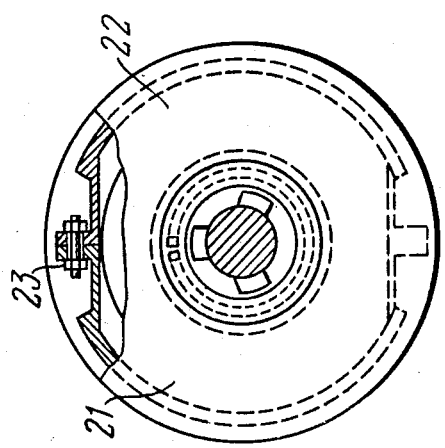

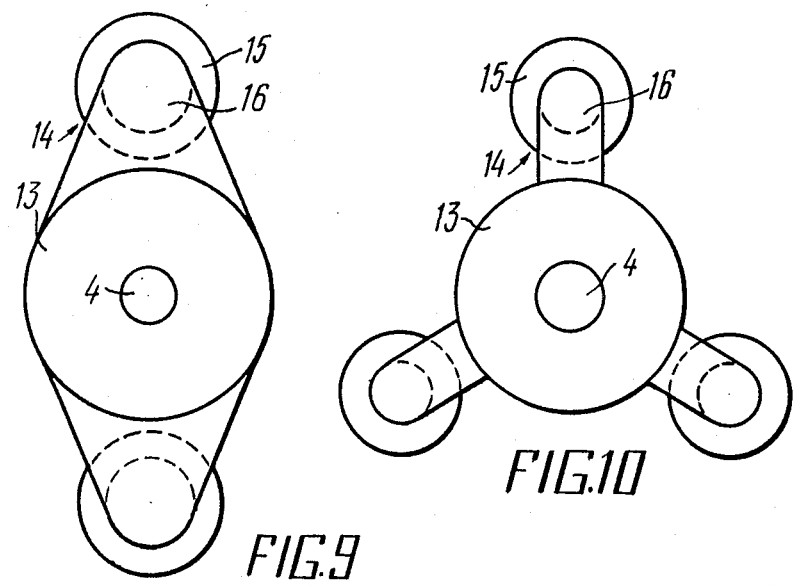

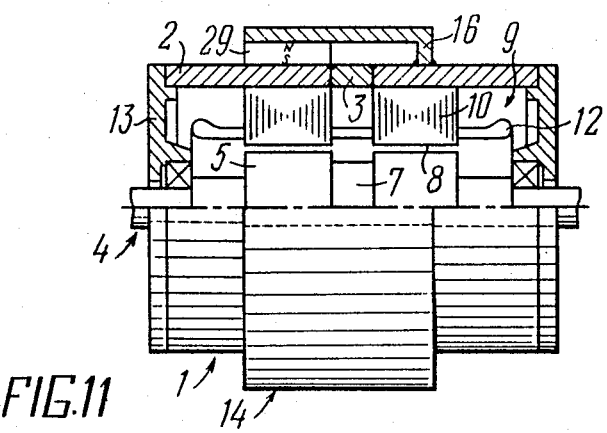
FIG.11
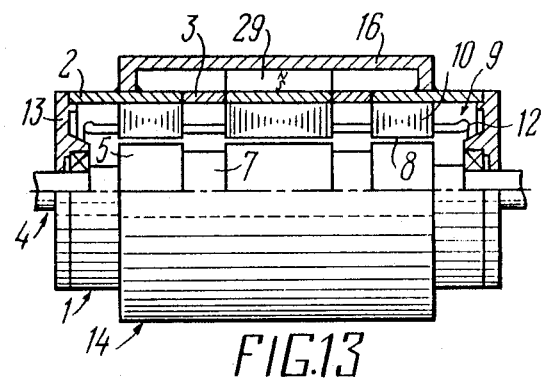
FIG.12
FIG.13

ELECTRICAL MACHINE

FIELD OF THE INVENTION

The present invention relates to the art of electrical engineering, and more particularly, to high-speed electrical machines such as self-controlled synchronous motors and synchronous generators.

The invention can most advantageously be used in high-speed electric drives for turbo-compressors, high-pressure pumps, fans, and high-speed wire-rolling mills.

DESCRIPTION OF THE PRIOR ART

At the present time extensive use is made of power sources having an increased output frequency and adapted for energizing all kinds of equipments including automatic-control systems of self-contained devices.

Synchronous alternating-current machines, preferably contactless electrical machines with various types of excitation system find application as power sources.

One of the main requirements imposed upon the synchronous machines of high-frequency power sources is an increase in their rotational speed.

Synchronous electrical machines in combination with power converters can be also used as high-speed electrical motors serving as drives for various types of turbo-compressors and other equipments, an increase in their rotational speed allowing their mass and sizing to be significantly reduced.

In turn, the tendency of creating high-speed electrical machines with the greatest possible speed of the rotor is closely associated with the provision of the required rotor strength, while retaining the main performance characteristics of the machine.

High-speed electrical machines use claw-shaped pole rotors and like-pole rotors.

Rotors with claw-shaped poles fail, however, to provide a desired degree of strength due to large bending forces arising from the action of centrifugal forces developed in the course of operation of the high-speed electrical machines, and resulting in unbending of the pole claws. This leads to the rotor failure.

Besides, in such machines significant leakage flux is developed between the pole claws of different polarity. This results in a decrease of the electrical machine efficiency, while increasing its overall dimensions and mass.

All these factors taken together result in limited usefulness of the claw-shaped rotors for high-speed electrical machines.

As compared to the claw-shaped pole rotors, the like-pole rotors, made in the form of pole systems having pole projections and interconnected by means of a magnetic circuit, feature a higher degree of strength and are easier to manufacture. Such rotors can be advantageously used in high-speed electrical machines.

Known in the art is an electrical machine comprising a cylindrical magnetically conductive housing accommodating a rotor made of a magnetically soft steel and designed as two pole systems having pole projections and interconnected by means of a magnetic circuit, a stator having two stacks of laminations and mounted with a clearance with respect to the rotor, and an excitation system comprising permanent magnets and magnetic circuits enclosing the stator stacks, the excitation system being coaxially arranged between the stator and the machine housing (Cf.Report of the All-Union Research Institute "Elektromash", "Feasibility Investigations in the Field of High-Speed Controlled Engines for Turbo-compressors of Cryogenic Plants," No. 78070366, p 2, FIG. 1b).

The above electrical machine can be further provided with axial cooling channels made in the stator stacks which serve to internally cool the machine, thus enabling thermal loads on the machine's active parts to be increased.

This electrical machine requires, however, a great accuracy of assembling due to a large number of members arranged coaxially with the rotor, since the total error in the dimensions of said members determines a value of the rotor eccentricity with respect to the stator, an increase in the rotor eccentricity deteriorating power factors of the machine as well as operating characteristics of its mechanical units such as bearing assemblies, end shields, etc., and thus causing extra vibrations and noise of the machine.

The above disadvantages are eliminated in an electrical machine comprising a cylindrical housing accommodating a rotor made of a magnetically soft steel and designed as two pole systems having pole projections and interconnected by means of a magnetic circuit, a stator having two stacks of laminations, and an excitation system designed as a coil mounted between the stator stacks (Cf. a paper by E. L. Lustenader, R. H. Guess, E. Richter, and F. G. Turnbul "Development of a Hybrid Flywheel/Battery Drive System for Electric Vehicle Applications" in IEEE Transactions on Vehicular Technology, vol. VT-26, No. 2, May 1977).

The arrangement of the excitation system inside the housing of the electrical machine generates a need for applying the stator winding after the steps of mounting the stator stacks and the excitation system inside the housing. This arrangement not only considerably complicates the assembly of the electrical machine but furthermore, in the case of the failure of the excitation system, it is necessary to disassemble the whole electrical machine and to manufacture a new stator winding.

Again, the arrangement of the excitation system within the electrical machine housing between the stator stacks requires using a rotor of a significant length, which reduces its stiffness and, hence, the critical rotational speed of the electrical machine.

Furthermore, the arrangement of the excitation system between the stator stacks fails to provide internal cooling through axial cooling channels so that thermal loads on the machine's active parts cannot be increased.

SUMMARY OF THE INVENTION

Accordingly, the present invention is directed at simplifying the electrical machine in design.

Another object of the present invention is to provide an electrical machine with improved cooling.

Still another object of the present invention is to provide an electrical machine having an increased service life.

With these and other objects in view, there is provided an electrical machine comprising a cylindrical housing accommodating a rotor designed as two pole systems having pole projections and interconnected by means of a magnetic circuit, a stator having at least two stacks of laminations, and an excitation system, wherein, according to the invention, the excitation system is mounted on the outside of the electrical machine housing which is built up of magnetically conductive and nonmagnetic portions arranged alternately in an axial direction, a respective stator stack being secured to each of the magnetically conductive portions of the housing.

The arrangement of the excitation system on the outside of the housing simplifies the manufacturing process and assembly of the electrical machine due to the possibility of manufacturing the excitation system separately from the stator and, hence, with a less degree of accuracy. This arrangement also results in an improved maintainability of the electrical machine, since, in case of failure of the excitation system, there is no need for disassembling the whole electrical machine.

The arrangement of the excitation system outside the housing, especially when it is made as a coil, enables the length of a clearance between the stator stacks to be decreased, resulting in decreasing the rotor length, which, in turn, improves the strength and stiffness of the rotor and, therefore, provides a possibility of raising the critical rotational speed of the electrical machine as a whole.

Moreover, such an arrangement of the excitation system improves cooling of the electrical machine as a whole as well as of the excitation system itself, thus, increasing the operating reliability of the machine.

The provision of the machine housing built up of magnetically conductive and nonmagnetic portions arranged alternately in an axial direction, as well as securing of a respective stator stack to each of the magnetically conductive portions of the housing ensures normal performance conditions of the electrical machine, since the nonmagnetic portions of the housing eliminate by-passing of the magnetic flux across the housing.

According to one embodiment of the present invention, the excitation system comprises a coil enclosing the housing and embraced by a magnetic circuit adjoining the magnetically conductive portions.

Such structural arrangement of the excitation system is advisable in electrical machines which call for adjusting the magnetic flux in the course of its operation to regulate the rotor rotational speed or the output voltage in case the electrical machine operates as a generator.

Connection of the magnetic circuit of the excitation system with the magnetically conductive portions of the housing allows the magnetic path of the excitation system to be closed, whereby the magnetic flux is found to be in the air gap of the machine, thus ensuring the machine serviceability.

According to another embodiment of the invention, the magnetic circuit of the excitation system is made in the form of a ring having a U-shaped section and is composed of at least two portions interconnected in a radial direction by means of a detachable joint, such as by bolts.

The provision of the magnetic circuit of the excitation system as a ring of U-shaped section makes it possible to raise the strength and stiffness of the electrical machine due to unloading of the least stiff and strong portion of the housing, namely its nonmagnetic portion. This provides the possibility of fastening the electrical machine by its central piece, i.e. the magnetic circuit, which is of particular importance for electrical machines serving as drives for high-speed wire-rolling mills, where it is necessary to reduce the overall dimensions and mass of the platform on which the electrical machine is pivotally mounted.

The magnetic circuit of the excitation system, composed of at least two portions interconnected by means of a detachable joint in a radial direction, provides ease of assembling and disassembling of the excitation system and access to the coils thereof, while keeping high strength and stiffness of the system.

An increase in the number of portions composing the magnetic circuit of the excitation system is expedient for electrical machines of high power and large overall dimensions.

In still another embodiment of the present invention, at least one of the magnetically conductive portions of the housing is provided with at least one annular groove adapted to receive an annular projection made on the magnetic circuit of the excitation system.

The provision of the annular groove on the magnetically conductive portion of the housing in combination with the annular projection on the magnetic circuit of the excitation system provides interlocking of said elements, that features high strength and stiffness, thus providing reliable interlocking of the magnetic circuit with the machine housing, which is of particular importance for electrical machines serving as drives for high-speed wire-rolling mills.

It is preferable according to yet another embodiment of the present invention, that the excitation system comprise at least one magnetic circuit connected with the magnetically conductive portions of the housing and at least one coil fitted on said magnetic circuit.

Since the excitation system is made as a coil fitted onto the magnetic circuit, it can be mounted at a certain distance from the electrical machine, thus ensuring the possibility of forced air cooling over the entire length of the machine housing along with radial blowing through all parts of the electrical machine. This improves cooling of the electrical machine resulting in improved reliability.

Such an embodiment of the excitation system is preferable to use for high-powered electrical machine with closed cooling.

It is also preferable according to still another embodiment of the present invention, that the excitation system comprise permanent magnets mounted on the housing in the area of at least one magnetically conductive portion, and a magnetic circuit enclosing said permanent magnets. The magnetically conductive portions of the housing are devoid of contact with the permanent magnets adjoining the magnetic circuit of the excitation system.

The excitation system made in the form of permanent magnets mounted on the housing and enclosed by the magnetic circuit is suitable for electrical machines with a small control range of rotational speed, wherein there is no need to change the magnetic flux in the course of its operation. Such electrical machine can be suitably used as a drive of a blower.

According to yet another embodiment of the invention, the electrical machine is further provided with cases made integral with the nonmagnetic portions of the housing and having cells to install the permanent magnets therein, while the magnetic circuit embracing said permanent magnets is mounted with a clearance with respect thereto, and is in contact with said cases.

This embodiment of the present invention makes it possible to simplify the arrangement of the permanent magnets on the electrical machine housing.

The clearance provided between the permanent magnets and the magnetic circuit as well as the contact provided between the magnetic circuit and the cases eliminates transmission of mechanical forces from the magnetic circuit to the permanent magnets, thus eliminating the damage and failure of the latter. The above factors make it possible to improve the operating reliability of the electrical machine and to increase the vibration resistance of the excitation system.

The cases made integral with the nonmagnetic portions of the housing increase the strength of joint between the magnetically conductive portions of the housing due to an increased length of the conjugated parts.

Another embodiment of the present invention consists in that additional permanent magnets magnetized in an axial sense are arranged between the stator stacks, the nonmagnetic portions of the housing being provided with slots made in the inner surfaces to receive said additional permanent magnets.

The provision of the additional permanent magnets magnetized in an axial sense and arranged between the stator stacks lowers the leakage flux in the electrical machine, thus increasing the efficiency of the magnets of the excitation system and reducing the total mass.

The arrangement of the additional permanent magnets in the slots made in the inner surfaces of the nonmagnetic portions of the housing ensures ease of fastening of said magnets to the machine housing.

It is also advisable to provide annular recesses in the magnetically conductive portions of the housing and annular projections made on the nonmagnetic portions and entering said annular recesses. The nonmagnetic portions along the periphery are made of at least two sections connected with each other.

The provision of the annular recesses on the magnetically conductive portions of the housing and annular projections made on the nonmagnetic portions and entering the respective recesses ensures lock joint of the housing portions, thus increasing its strength and stiffness.

The nonmagnetic portions made of at least two sections ensure ease of assembly and disassembly of the electrical machine.

In case of large overall dimensions of the electrical machine housing, it is advisable that the nonmagnetic portions be made from a greater number of sections.

A further embodiment of the present invention is that in the electrical machine including axial cooling channels made in the stator stacks, the nonmagnetic portions of the housing comprise two rings interconnected by means of stiffening ribs spaced apart along the periphery so as to provide radial cooling channels between the stiffening ribs and said rings, the excitation system coils are arranged on both sides of the nonmagnetic portion, and the magnetic circuit enclosing said coils is made from separate members disposed above the stiffening ribs.

Such an embodiment of the nonmagnetic portions of the housing ensures cooling of the active parts of the electrical machine by axial and radial cooling flows, thus doubling the amount of cooling agent, while the remaining section of the axial cooling channels is unchanged. Thus enables loads upon the active parts of the electrical machine to be increased, while upgrading its specific characteristics and improving its operating reliability.

This embodiment of the present invention can be suitably used in electrical machines of a large length or with a small section of its axial cooling channels.

The arrangement of the excitation system coils on both sides of the nonmagnetic portion of the housing, as well as the provision of the magnetic circuit made from separate members disposed above the stiffening ribs of the nonmagnetic portion, enables the cooling agent to leave the housing freely through the radial channels, thus decreasing the aerodynamic resistance and increasing the cooling efficiency of the electrical machine.

According to still another embodiment of the present invention, the nonmagnetic portion of the housing is shaped like a double-T beam in an axial section, the inner flange of the double-T beam being connected with the magnetically conductive portions of the housing and the outer flange being connected with the magnetic circuit of the excitation system whose coils are disposed between the flanges of the double-T beam on both sides of its cross-piece.

The double-T shape of the nonmagnetic portion of the housing provides for an increase in the housing stiffness which is of particular importance when fastening the electrical machine by its central piece, such as when electrical machines are used as drives for high-speed wire-rolling mills.

It is also advisable that each of the flanges of the double-T beam be shaped like a ring, both rings being arranged coaxially.

Such an embodiment simplifies the manufacture of the housing nonmagnetic portions shaped like a double-T beam in axial section.

According to still another embodiment of the present invention, in the electrical machine including axial cooling channels provided in the stator stacks, the flanges of the double-T beam are made in the form of ribs rigidly connected with the surfaces of the cross-piece thereof and spaced along the periphery to form radial cooling channels of the housing.

Such an embodiment of the nonmagnetic portions provides axial and radial cooling of the electrical machine and improved stiffness of its housing, thus increasing significantly the operating reliability of the electrical machine. Such an embodiment is of particular importance for electrical machines having large length and featuring an increased thermal loads.

It is also preferable that in the electrical machine including axial cooling channels provided in the stator stacks, the nonmagnetic portion of the housing be made in the form of plates spaced along the periphery to form radial cooling channels of the housing.

The provision of the nonmagnetic portion of the housing in the form of plates spaced along the periphery reduces metal input of the nonmagnetic portions and, hence, of the electrical machine as a whole. Such an embodiment of the present invention can be suitably used for electrical machines which are not exposed to drastic accelerations and sudden stops of the rotor.

According to still another embodiment of the present invention, the electrical machine is further provided with a stream deflector arranged between the stator stacks, the axial cooling channels of the adjacent stator stacks being displaced from each other by an angle $\alpha$ equal to one half the angle $\beta$ between the axial cooling channels provided in the same stator stack.

The arrangement of the stream deflector between the stator stacks and the provision of the axial cooling channels in the adjacent stator stacks displaced with respect to each other eliminate mutual influence of the cooling agent flows of adjacent stator stacks, thus decreasing aerodynamic resistance in the space between the stator stacks, which, in turn, results in an increase in the efficiency of the cooling flow and leads to an improved cooling of the electrical machine as a whole.

The displacement of the axial cooling channels in the adjacent stator stacks, by an angle α equal to one half the angle β between the axial channels provided in the same stator stack, ensures symmetry of the cooling flows in radial directions, which leads to uniform cooling of the field winding.

In case the axial cooling channels are displaced by an angle α not equal to one half the angle β, the oppositely directed flows will compensate each other, thus decreasing the coolng efficiency.

It is also perferable that the stream deflector be made as ribs spaced along the periphery and secured to the nonmagnetic portion of the housing.

The provision of the stream deflector in the form of ribs spaced along the periphery and secured to the nonmagnetic portion of the housing ensures minimal metal input of the stream deflector and its reliable fastening in the machine.

It is also preferable that the stream deflector be a thin-wall ring corrugated in the shape of a meander.

The stream deflector of such a shape is easier to manufacture.

In yet another embodiment of the present invention, the ribs of the stream deflector are disposed underneath the ribs of the nonmagnetic portion of the housing.

Such structural arrangement of the deflector ribs reduces aerodynamic resistance to radially directed flows of the cooling agent, thus increasing the flow rate, which leads, in turn, to an increased efficiency of the electrical machine cooling.

The above-mentioned and other features and objects of this invention and the manner of achieving them will become more apparent, and the invention itself will be better understood by reference to the following description of the illustrated embodiments of the invention, taken in conjunction with the accompanying drawings, wherein:

BRIEF DESCRIPTION OF THE DRAWINGS

FIG. 1 is a sectional view taken longitudinally and illustrating an electrical machine having two stator stacks;

FIG. 3 is a sectional view taken longitudinally and illustrating an electrical machine having four stator stacks;

FIG. 5 is a sectional view taken along the line V—V of FIG. 4;

FIG. 6 is a front view illustrating a magnetic circuit of the excitation system and an electrical machine housing embodying one form of the present invention;

FIG. 9 is a side view illustrating another embodiment of the electrical machine;

FIG. 10 is a side view illustrating a further embodiment of the electrical machine;

FIG. 11 is a sectional view taken longitudinally and illustrating an embodiment of the electrical machine, wherein the excitation system comprises permanent magnets;

FIG. 12 is a sectional view taken longitudinally and illustrating another embodiment of the electrical machine, wherein the excitation system comprises permanent magnets;

FIG. 13 is a sectional view taken longitudinally and illustrating another embodiment of the electrical machine having the excitation system comprising permanent magnets;

DETAILED DESCRIPTION OF THE INVENTION

Figure 4:
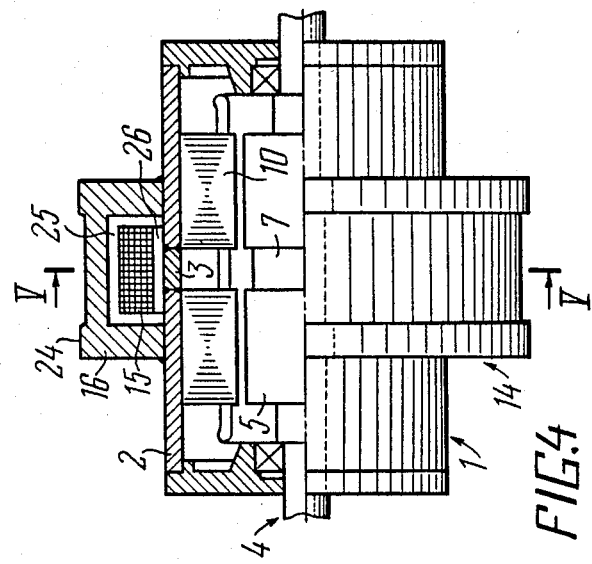
FIG. 4 is a sectional view taken longitudinally and illustrating one embodiment of the electrical machine having two stator stacks.

Referring now to the drawings in more detail and in particular to FIG. 1, the electrical machine comprises a cylindrical housing 1 designed as two magnetically conductive portions 2 and one nonmagnetic portion 3, the portions 2,3 being arranged alternately in an axial direction and connected with each other by welding.

The other available versions of connection of the portions 2,3 will be discussed hereinbelow.

The housing 1 accommodates thereinside a rotor 4 made of a magnetically soft steel and designed as two pole systems 5 with pole projections 6 (FIG. 2) offset by 180° electrical, the pole systems 5 (FIG. 1) being interconnected by means of a magnetic circuit 7.

Further provided within the housing 1 is a stator 9 mounted with a clearance 8 with respect to the rotor 4 and having stacks 10 of laminations.

Each of the stator stacks 10 has coil-accommodating slots 11 for the stator winding 12 and is pressed in the respective magnetically conductive portion 2 of the housing 1.

Thus, the magnetically conductive portions 2 of the housing 1 are equal in number to the stator stacks 10.

It should be noted that other embodiments of the stator 9 are possible. For example, the stator 9 can be provided with cooling channels. This will be described hereinbelow.

Mounted at the ends of the housing 1 are end shields 13 made either from a nonmagnetic material such as aluminium or with a nonmagnetic insert (not shown) to avoid by-passing of the magnetic flux induced in the machine.

An excitation system 14 is mounted on the outside of the housing 1. Such a structural arrangement of the excitation system 14 provides independent manufacturing of said system and the stator 9 with the result that there is no need of disassembling the whole electrical machine in case of failure of the excitation system 14.

The excitation system comprises a coil 15 enclosing the housing 1 along the periphery, and a magnetic circuit 16 embracing the coil 15 from three sides and adjoining the magnetically conductive portions of the housing 1.

The coil 15 of the excitation system 14 arranged on the outside of the housing 1 enables the rotor length to be decreased due to a decreased space between the stator stacks 10, which leads to an increase in the strength and stiffness of the rotor 4, which, in turn, makes it possible to raise the critical rotational speed of the machine.

The number of the coils 15 of the excitation system 14 depends upon the number of the stator stacks 10 and in the case where the electrical machine has n stator stacks 10, the number of the coils 15 equals to n−1.

The other embodiments of the excitation system 14 will be described hereinbelow.

The magnetic circuit 16 is connected with the magnetically conductive portions 2 of the housing 1 by welding. The other embodiments of the connection of the magnetic circuit 16 with the magnetically conductive portions 2 of the housing 1 will be illustrated hereinbelow.

The connection of the magnetic circuit 16 with the magnetically conductive portions 2 provides closing of the magnetic path of the excitation system 14 with the result that the magnetic flux is found to be in the airgap 8 of the electrical machine.

The magnetic circuit 16 is designed as separate sections 17, 18, 19 interconnected in an axial direction, for example, by welding. This simplifies the manufacture of the magnetic circuit 16.

The other embodiments of the magnetic circuit 16 will be described hereinbelow.

The entire magnetic network of the electrical machine consists of the magnetic circuit 16 of the excitation system 14, the magnetically conductive portions 2 of the housing 1, the stator stacks 10, the rotor pole systems 5 and the magnetic circuit 7 of the rotor 4.

The above construction is preferable for electrical machines in which it is necessary to adjust the magnetic flux in the course of machine operation for controlling the rotational speed of the rotor or the output voltage in case the electrical machine operates as a generator.

FIG. 3 illustrates a four-stack electrical machine, the elements being similar to the elements of the electrical machine shown in FIG. 1 and designated by the same reference numerals.

The difference lies in that the four-stack electrical machine has the excitation system 14 comprising three coils 15 with magnetic circuits 20 mounted therebetween and serving to apply the magnetic flux to the respective stator stacks 10, the length of the extreme stacks 10 of the stator 9 being one half the length of the other stator stacks 10. This is of particular importance for multi-stack electrical machines, since each of the extreme stacks 10 transmits the magnetic flux induced by one coil 15, while each of the remaining stator stacks 10 transmits the magnetic flux incuded by two coils 15.

In the embodiment shown in FIG. 4, the magnetic circuit 16 of the excitation system 14 is a ring having a U-shaped section, consisting of two portions 21, 22 (FIG. 5) interconnected in a radial direction, by bolts 23, and provided with two mounting seats 24 for fixing the electrical machine.

The magnetic circuit 16 designed as a ring having a U-shaped section is characterized by an increased stiffness. This enables the magnetic circuit 16 of less thickness to be used, resulting in a lower metal input of the magnetic circuit 16 and of the electrical machine as a whole.

The magnetic circuit 16 featuring an improved stiffness makes it possible to fix the electrical machine by its mounting seats 24 of the central piece which is preferable for electrical machines used as drives for high-speed wire-rolling mills.

The provision of the magnetic circuit 16 of the U-shaped section composed of two portions 21, 22 eases assembling and disassembling of the excitation system 14, while maintaining the strength and stiffness of the magnetic circuit 16 at a desired level.

It is possible to provide the magnetic circuit 16 composed of a greater number of portions (not shown) interconnected in a radial direction, which is expedient for electrical machines with large diameter.

The coil 15 of the excitation system 14 is mounted with a clearance 25 with respect to the magnetic circuit 16 and with a clearance 26 with respect to the housing 1, which decreases heating of the coil 15 from the housing 1.

The other elements of the electrical machine shown in FIG. 4 are similar to that shown in FIG. 1 and are designated by the same reference numerals.

According to still another embodiment of the present invention, as best shown in FIG. 6, the magnetic circuit 16 designed, as a ring having a U-shaped section, has an annular projection 27 provided on its surface adjoining the surface of one of the magnetically conductive portions 2 of the housing 1 and entering an annular groove 28, e.g. key groove, made in said magnetically conductive portion 2 of housing 1.

The annular projection 27 on the magnetic circuit 16 in combination with the annular groove 28 in the magnetically conductive portion 2 of the housing 1 prevents the magnetic circuit 16 from axial displacement with respect to the housing 1. This is of particular importance in case of inclined or vertical arrangement of the electrical machine fixed by its central piece, i.e. the magnetic circuit 16 of the excitation system 14.

Furthermore, the provision of the projection 27 and the groove 28 ensures a reliable interlocking of the magnetic circuit 16 with the magnetically conductive portion 2 of the housing 1, characterized by increased strength and stiffness.

It is possible to provide two annular projections 27 on the body of the magnetic circuit 16 and the annular grooves 28 made in two magnetically conductive portions 2 and disposed on opposite sides of the coil 15 of the excitation system 14 (not shown), thus improving the reliability of connection between the magnetic circuit 16 and the housing 1.

Figure 7:
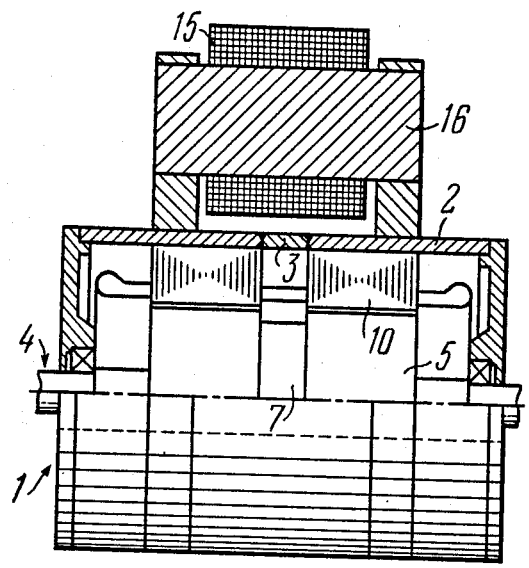
FIG. 7 is a sectional view taken longitudinally and illustrating another embodiment of the electrical machine having two stator stacks.
Figure 8:
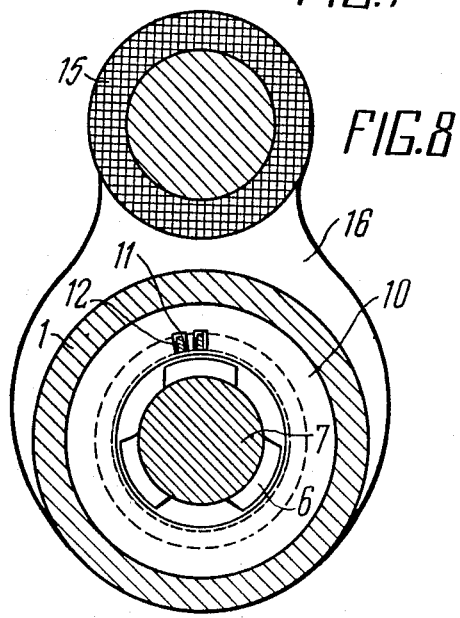
FIG. 8 is a cross-sectional view illustrating a housing and an excitation system of the electrical machine shown in FIG. 7.

According to a further embodiment of the present invention shown in FIGS. 7 and 8, the excitation system 14 comprises the magnetic circuit 16 having a U-shaped axial section and connected with the magnetically conductive portions 2 of the housing 1 by welding, and the coil 15 fitted on said magnetic circuit 16.

In this embodiment of the present invention, the length of a coil turn is significantly less than in the embodiment shown in FIG. 1, resulting in a descreased mass of copper used for the excitation system winding.

The magnetic circuit according to the above embodiment has a diameter less than a diameter of the magnetic circuit 16 shown in FIG. 1 and enclosing the housing 1.

Thus, the excitation system 14 of the electrical machine shown in FIGS. 7 and 8 is characterized by a reduced metal input.

Figure 2:
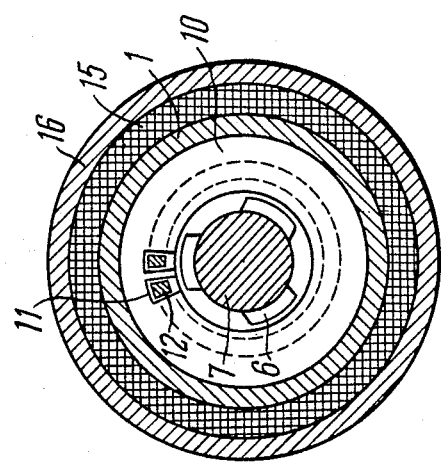
FIG. 2 is a sectional view taken along the line II—II of FIG. 1.

The other elements of the electrical machine shown in FIGS. 7 and 8 are similar to those shown in FIGS. 1 and 2 and are designated by the same reference numerals.

The excitation system 14 of the above embodiment can be mounted at a certain distance from the electrical machine housing. This allows a heat exchanger (not shown) to be mounted on the machine housing 1, improving its cooling. Again, such structural arrangement of the excitation system 14 obviates the influence of the heat liberated in the coil 15 upon the temperature of the housing 1.

Such a construction of the excitation system 14 is preferable in electrical machines of large diameter having significant thermal losses in the active parts.

Shown in FIG. 9 is still another embodiment of the excitation system 14, which has two magnetic circuits 16 and two coils 15 fitted each onto the respective magnetic circuit 16.

Such a construction of the excitation system 14 is preferable for electrical machines having a large ratio of the housing diameter to its length.

According to still another embodiment shown in FIG. 10, the excitation system 14 comprises three magnetic circuits 16 each having a coil 15 fitted thereon.

Such an embodiment of the excitation system 14 can be advantageously used in electrical machines featuring high magnetic flux density in the stacks 10 of the stator 9 wherein the magnetic flux variations caused by one-sided arrangement of the coil 15 (FIG. 7) are perceptible.

According to the invention, in the electrical machines with a small control range of the rotational speed, wherein there is no need to change the magnetic flux in the course of operation, the excitation system 14 (FIG. 11) is designed in the form of permanent magnets 29 embraced by the magnetic circuit 16.

The permanent magnets 29 are made in the form of plates mounted in the housing 1 in the area of one of the magnetically conductive portions 2 and are secured thereto with adhesive.

The magnetic circuit 16 is made in the form of a ring having an L-shaped axial section and connected by welding with that magnetically conductive portion 2 of the housing 1 which is devoid of contact with the permanent magnets 29.

The arrangement of the permanent magnets 29 in the area of only one of the magnetically conductive portions 2 of the housing 1 is suitable in electrical machines wherein the outer surface of its housing is allowed for installation of auxilliary devices and units such as air conduits of commutation and starting devices, protection devices, etc.

The other elements of the machine described hereinabove are similar to the elements of the machine shown in FIGS. 1 and 2.

The other modifications of the excitation system 14 provided with the permanent magnets 29 are available and will be described below.

Referring now to FIG. 12, there is shown a two-stack electrical machine wherein both magnetically conductive portions 2 of the housing 1 are in contact with permanent magnets 29, 30, the permanent magnets 29 facing the adjoining magnetically conductive portion 2 with their north poles, and the permanent magnets 30 facing the adjoining magnetically conductive portion 2 with their south poles.

In this case, the magnetic circuit 16 is shaped like a ring enclosing the permanent magnets 29, 30.

Such a modification of the excitation system can be suitably used in electrical machines featuring high dismagnetizing effect of the reaction of the stator winding 12.

Shown in FIG. 13 is a three-stack electrical machine wherein the intermediate magnetically conductive portion 2 of the housing 1 is in contact with the permanent magnets 29, while the extreme magnetically conductive portions 2 thereof are interconnected by the magnetic circuit 16 enclosing the permanent magnets 29 and made in the form of a ring of U-shaped section.

Such a modification of the excitation system 14 is suitable for electrical machine wherein the outer surface of its housing is used for installation of various units such as pipe-lines, terminal boxes, etc.

Selection of the embodiment of the excitation system 14 having the permanent magnets 29, 30, shown in FIGS. 11 to 13, is also governed by the grade of the material used for the permanent magnets. When employing the magnets with a large coercive force, it is moe expeditious to make use of the constructions shown in FIGS. 11 and 13.

Dimensions of the permanent magnets 29, 30 are chosen according to the embodiments of the excitation system 14 used, as well as according to magnetic characteristics.

Figure 14:
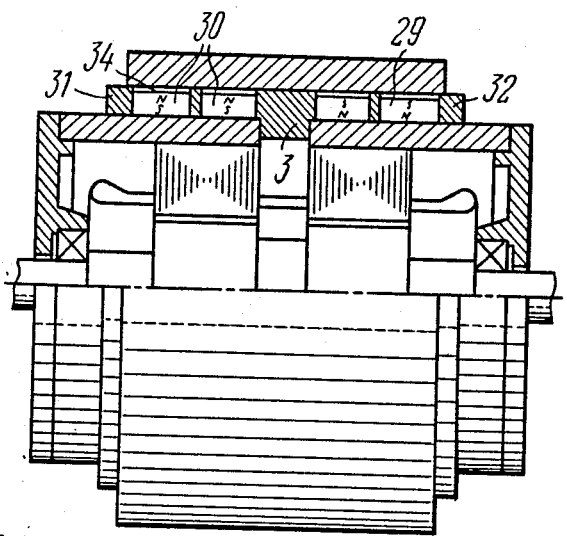
FIG. 14 is a sectional view taken longitudinally and illustrating an embodiment of the electrical machine provided with cases for permanent magnets.

According to still another embodiment of the excitation system 14 provided with the permanent magnets 29, 30, as best shown in FIG. 14, the excitation system 14 comprises cases 31, 32 made integral with the non-magnetic portion 3 of the housing 1.

Figure 15:
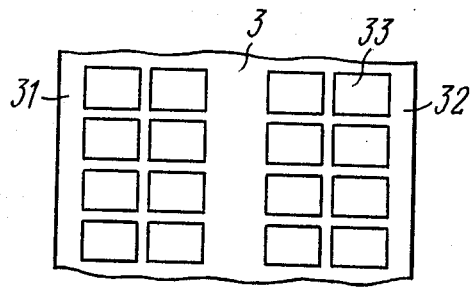
FIG. 15 is an enlarged developed view illustrating a case for permanent magnets.

Each of the cases 31, 32 has cells 33 (FIG. 15) to receive the permanent magnets 29, 30 (FIG. 14), which simplifies the attachment of said magnets to the housing 1.

The cases 31, 32 have a thickness greater than the permanent magnets 29, 30. The thickness difference is dictated by the allowance for the magnet machining as well as by the temperature changes in dimensions of the electrical machine members. Considering that variations in the dimensions of suitable ceramic magnets after their moulding equal to ±2%, i.e. a quantity having insignificant influence on the permeance of the entire magnetic circuit, in the proposed construction it is possible to make use of unfinished permanent magnets whose cost is lower by 20-30% than that of the finished ones.

The cases 31, 32 are mated and connected by a tight fit with the magnetically conductive portions 2 of the housing 1 and with the magnetic circuit 16 of the excitation system 14.

Due to the difference in thickness of the magnets 29, 30 and the cases 31, 32, there are provided clearances 34 formed between said permanent magnets 29, 30 and the magnetic circuit 16 of the excitation system 14.

Said clearances 34 make it possible to avoid transmission of mechanical efforts from the housing 1 and the magnetic circuit 16 to the permanent magnets 29, 30, thus improving their durability and increasing the reliability of the electrical machine as a whole.

The other members of the electrical machine in question are made in a similar manner as shown in FIG. 12.

In case the permanent magnets 29 (FIGS. 11 and 13) are mounted only in the area of one of the magnetically conductive portions 2 of the housing 1, the electrical machine comprises only one case (not shown in the drawing).

In case of a three-stack electrical machine, wherein the permanent magnets 29, 30 (FIG. 16) are mounted only on the extreme magnetically conductive portions 2 of the housing 1, the cases 31, 32 are separated from each other by the intermediate magnetically conductive portion 2 connected with the magnetic circuit 16 of the excitation system 14. This makes the excitation system 14 easier to design due to a decreased number of the magnets used.

The other members of the electrical machine are similar to the elements of the electrical machine shown in FIG. 13.

According to still another embodiment of the present invention, the electrical machine is further provided with additional axially magnetized permanent magnets 35 disposed between the stator stacks 10 (FIG. 16) and mounted in slots 36 made in the inner surfaces of the nonmagnetic portions 3 of the housing 1.

The poles of the magnets 35 are located with respect to the poles of the magnets 29, 30 in such a manner as to provide magnetic flux oppositely directed with respect to said permanent magnets.

The dimensions of the additional permanent magnets 35 as well as the number thereof are dictated by the creation of the magnetic field circumferentially distributed in a uniform manner and having its magnetic intensity only slightly exceeding the intensity of the leakage flux.

The provision of the additional permanent magnets 35 arranged between the stator stacks 10 increases the magnetic flux density in the airgap of the electrical machine, thus raising its power.

The use of the additional permanent magnets 35 is preferable in electrical machines with a small spacing between the stator stacks 10.

Mounting the magnets 35 in the slots 36 is the most simple and reliable way of retaining said magnets on the nonmagnetic portions 3 of the housing 1. It should be noted, however, that other versions of retaining said magnets on the nonmagnetic portions 3 are possible, for example, the magnets 35 can be glued to the portions 3 of the housing 1.

Figure 17:
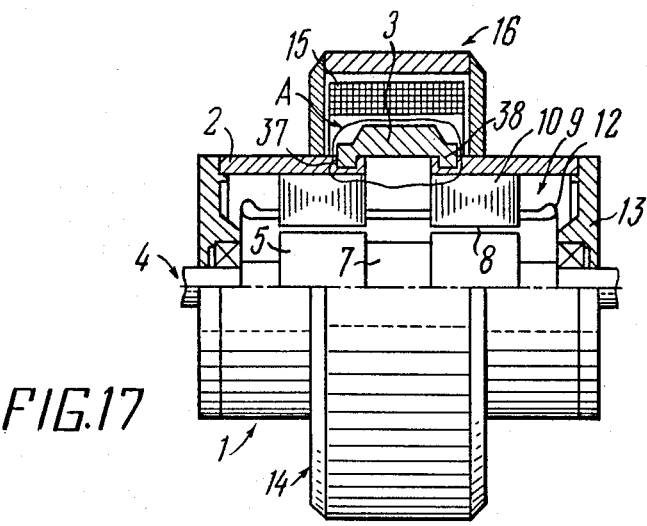
FIG. 17 is a sectional view taken longitudinally and illustrating still another embodiment of the electrical machine.

In yet another embodiment of the present invention, as best shown in FIG. 17, annular recesses 37 are made on the outer surfaces of the magnetically conductive portions 2 of the housing 1 in the immediate vicinity to the nonmagnetic portion 3 thereof to receive annular projections 38 provided on the inner surface of said portion 3. In doing so, the nonmagnetic portion 3 has a trapezoid shape in an axial section to improve its stiffness and strength.

The above embodiment of the present invention provides reliable interlocking of the portions 2, 3 of the housing 1, that features high strength and stiffness.

Figure 18:
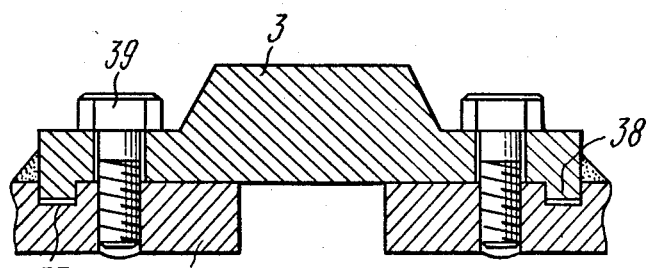
FIG. 18 is an enlarged sectional view taken longitudinally and illustrating an assembly A of FIG. 17.

To provide a more reliable joint of the portions 2, 3, said portions are additionally connected by bolts 39 (FIG. 18).

Figure 19:
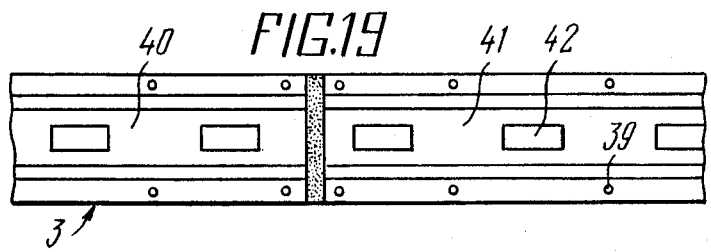
FIG. 19 is a developed view illustrating a nonmagnetic portion of the housing of the electrical machine shown in FIG. 17.

To simplify the process of assembling the housing 1, its nonmagnetic portion 3 is made of two sections 40, 41 (FIG. 19) interconnected, for example, by welding. In doing so, the magnetically conductive portions 2 are connected with the sections 40, 41 of the nonmagnetic portion 3, and then said sections are interconnected.

It is possible to build up the nonmagnetic portion 3 of a larger number of sections (not shown), which is preferable for electrical machines with a large diameter of the housing 1.

Made in the nonmagnetic portion 3 are windows 42 adapted to provide radial blowing of the cooling agent through the electrical machine.

In case of an electrical machine having a larger number of the stator stacks, all the nonmagnetic portions 3 of the housing 1 are designed in a similar manner (not shown).

The other elements of the electrical machine shown in FIG. 17 are similar to the elements of the electrical machine shown in FIG. 1.

Figure 21:
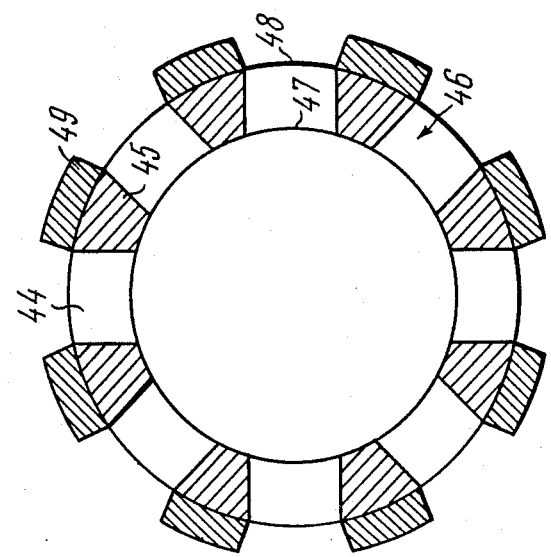
FIG. 21 is an enlarged sectional view taken longitudinally and illustrating structural arrangement of the nonmagnetic portion of the housing and the magnetic circuit of the excitation system of the electrical machine shown in FIG. 20.

According to still another embodiment of the invention, in the electrical machine having axial cooling channels 43 made in the stator stacks 10 (FIG. 20), the nonmagnetic portion 3 of the housing 1 comprises two rings 44 interconnected by means of stiffening ribs 45 (FIG. 21) spaced along the periphery and made in the form of wedge-shaped plates.

It should be noted that in this case the nonmagnetic portion 3 can be fabricated either as a one-piece member or as separate members 44, 45 interconnected, by welding.

The nonmagnetic portion 3 (FIG. 20) is connected with the magnetically conductive portions 2 by welding.

Radial cooling channels 46 formed between the rings 44 and stiffening ribs 45 provide cooling of the active parts of the electrical machine in a radial direction, thus substantially improving the operating reliability of the machine.

The stiffening ribs 45 (FIG. 21) made in the form of the wedge-shaped plates enable the length of the arc 47 defining the radial cooling channels 46 to be increased as compared to the arc 48 of the wedge-shaped plates.

This, in turn, makes it possible to increase the channels 46 in section and to decrease their aerodynamic resistance.

It is preferable that the number of the radial cooling channels 46 be at least twice that of the axial cooling channels 43, thus enabling the aerodynamic resistance of the radial cooling channels 46 to be reduced.

Such an embodiment of the nonmagnetic portion 3 of the housing 1 is suitable for use in electrical machines having either large length or small section of the axial cooling channels made in the stator stacks 10.

The excitation system 14 comprises two coils 15 mounted on the magnetically conductive portions 2 at both sides of the nonmagnetic portion 3 and the magnetic circuit 16 built up of separate rectangular members 49 (FIG. 21) arranged above the stiffening ribs 45 and of two annular members 50 (FIG. 20) connecting the members 49 of the magnetic circuit 16 with the magnetically conductive portions 2 of the housing 1, the members 50 being connected with the members 49 and with the magnetically conductive portions 2 by welding.

The connection of the above members by bolts is also available.

Such construction of the excitation system contrubutes to free exit of the cooling agent through the radial cooling channels 46 with the result that the aerodynamic resistance of the channels 46 is reduced, which leads to an increase in the cooling efficiency of the electrical machine.

Provided in the end shield 13 are openings 51 adapted to supply the cooling agent to the axial channels 43 for cooling the stator stacks 10.

Figure 20:
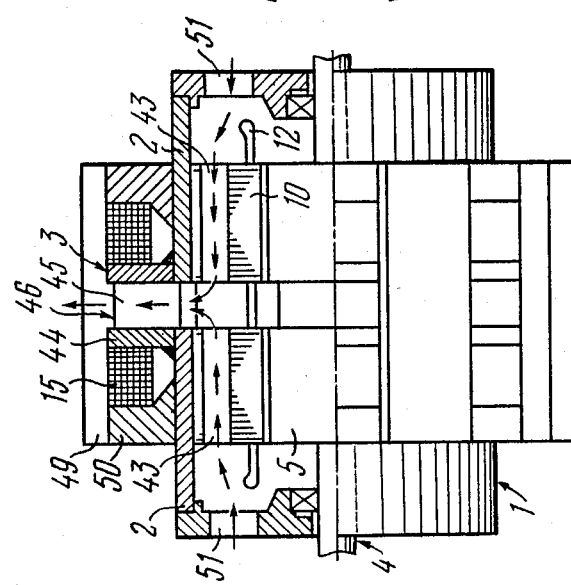
FIG. 20 is a sectional view taken longitudinally and illustrating another embodiment of the electrical machine having axial and radial cooling channels.

The other elements of the electrical machine of FIG. 20 are similar to the elements of the electrical machine of FIG. 1 and are designated by the same reference numerals.

Figure 22:
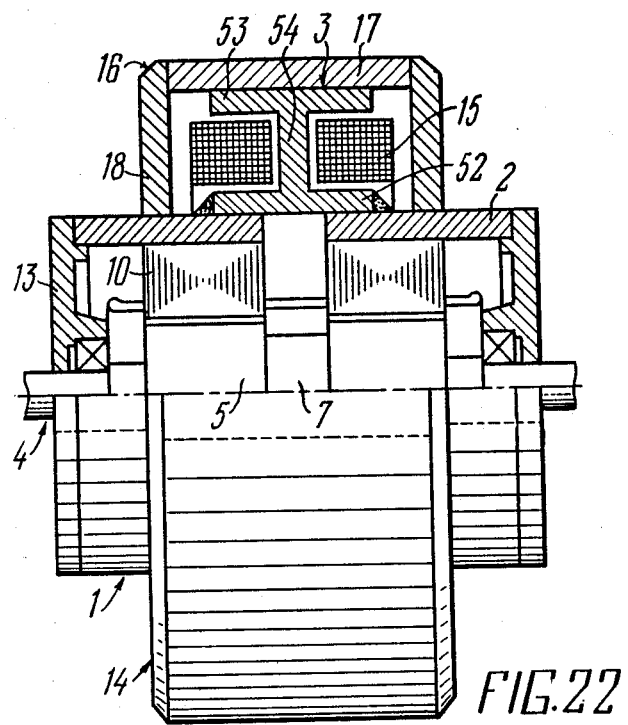
FIG. 22 is a sectional view taken longitudinally and illustrating another embodiment of the electrical machine, wherein the nonmagnetic portion of the housing has a shape of a double-T beam in axial section.

In still another embodiment of the present invention shown in FIG. 22, the nonmagnetic portion 3 of the housing 1 is shaped in axial section like a double-T beam, whose inner flange 52 is connected, for example by welding, with the magnetically conductive portions 2 of the housing 1, while the outer flange 53 is connected, for example by welding, with the magnetic circuit 16 of the excitation system 14.

Such a structure of the nonmagnetic portion 3 improves the stiffness of the housing 1 in combination with the excitation system 14.

Each of the flanges 52, 53 of the double-T beam is shaped like a ring connected with a cross-piece 54 by welding, both rings being arranged coaxially. This substantially simplifies fabrication of the nonmagnetic portion 3 of the housing 1. Two coils 15 of the excitation system 14 are mounted between the flanges 52, 53 on both sides of the cross-piece 54 of the double-T beam.

In so doing, the magnetic circuit 16 of the excitation system 14 is a ring having a U-shaped section.

The other elements of the electrical machine shown in FIG. 22 are similar to the elements of the electrical machine shown in FIG. 4 and are designated by the same reference numerals.

The above construction can be advantageously used in electrical machines serving as drives of high-speed wire-rolling mills.

According to the invention, other modifications of the nonmagnetic portion 3 having a double-T shape in an axial section are possible.

Figure 23:
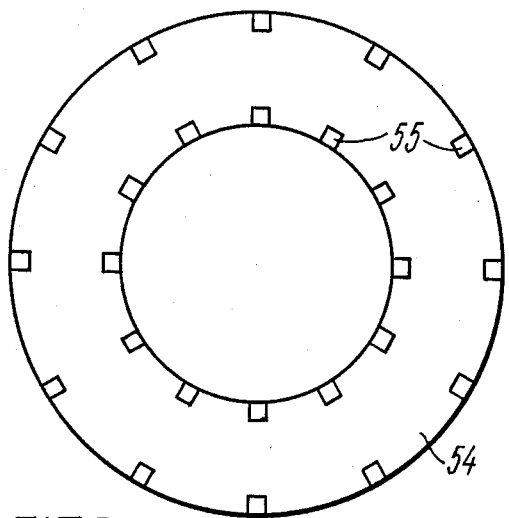
FIG. 23 is an enlarged side view illustrating another embodiment of the nonmagnetic portion of the housing of the electrical machine shown in FIG. 22.

As best shown in FIG. 23, the flanges 52, 53 are made in the form of ribs 55 rigidly connected to the cross-piece 54, for example by welding, spaced along the periphery and defining radial cooling channels 46 of the housing 1.

The above modification of the nonmagnetic portion 3 ensures both axial and radial cooling of the electrical machine, increases stiffness of the housing 1, and can be advantageously used in electrical machines characterized by large length and increased thermal loads.

The other elements of the electrical machine described hereinabove are similar to the elements of the electrical machine shown in FIG. 20.

Figure 24:
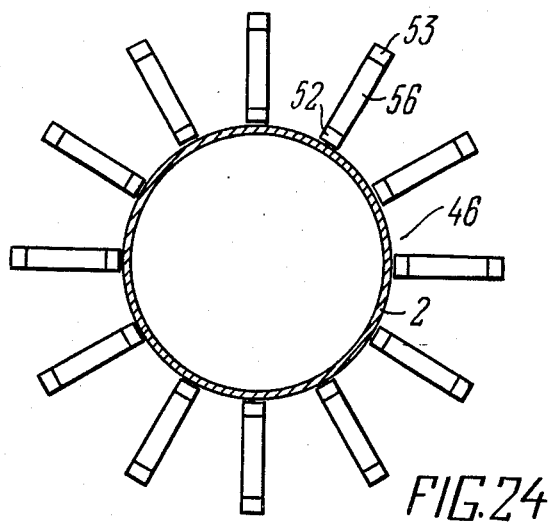
FIG. 24 is an enlarged side view illustrating another embodiment of the nonmagnetic portion of the housing of the electrical machine shown in FIG. 22.

In the embodiment shown in FIG. 24, the nonmagnetic portion 3 is built up of plates 56 having a double-T shape, spaced along the periphery and forming radial cooling channels 46 of the housing 1.

The above structure of the nonmagnetic portion 3 makes it possible to reduce its metal input and, hence, the metal input of the whole electrical machine, increasing, at the same time, the stiffness of the housing 1.

Such an embodiment of the present invention can be advantageously used in electrical machines free from drastic accelerations and sudden stops of the rotor 4.

The other elements of the electrical machine described above are similar to those shown in FIG. 20.

Shown in FIGS. 22 through 24 is a two-stack electrical machine, an electrical machine having a greater number of stacks being accomplished in a similar manner.

Figure 25:
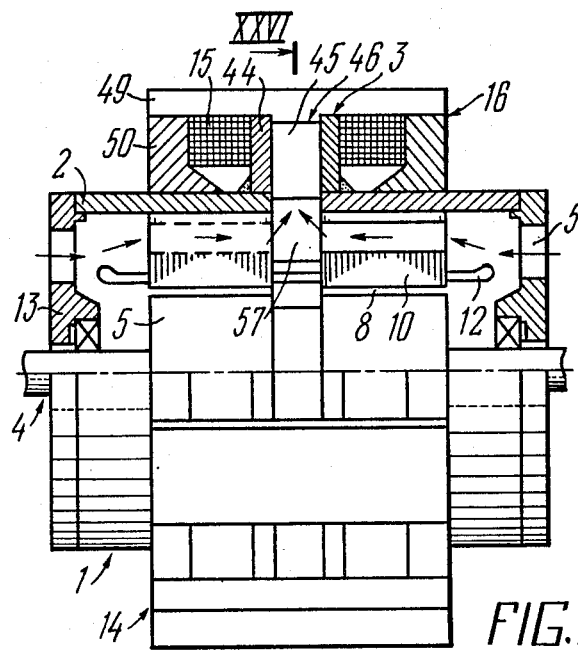
FIG. 25 is a sectional view taken longitudinally and illustrating another embodiment of the electrical machine provided with a stream deflector.

According to still another embodiment of the present invention shown in FIG. 25, the electrical machine, including the axial channels 43 for cooling the stator stacks 10 and the radial channels 46 for cooling the housing 1, is further provided with a stream deflector 57 arranged between the stator stacks 10.

Figure 26:
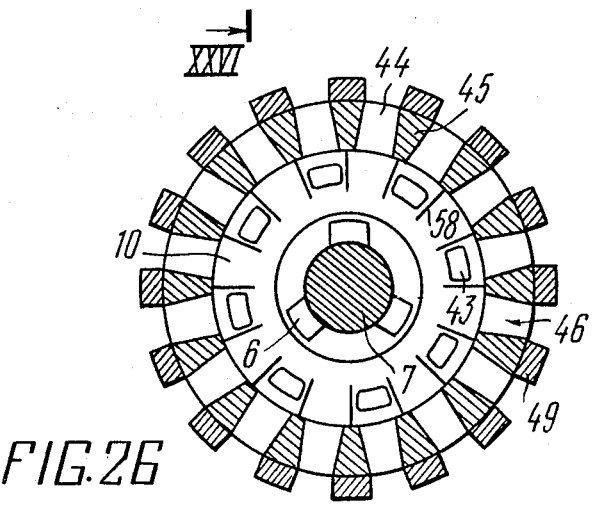
FIG. 26 is a sectional view taken along the line XXVI—XXVI of FIG. 25.

The stream deflector 57 is made in the form of ribs 58 (FIG. 26) spaced along the periphery and secured to the stiffening ribs 45 of the nonmagnetic portion 3 of the housing 1 by welding, the axial channels 43 (FIG. 25) for cooling the adjacent stator stacks 10 being disposed on opposite sides of the ribs 58 of the stream deflector 57.

The above structure of the stream deflector 57 ensures its minimal metal input and reliable fastening in the electrical machine.

Figure 27:
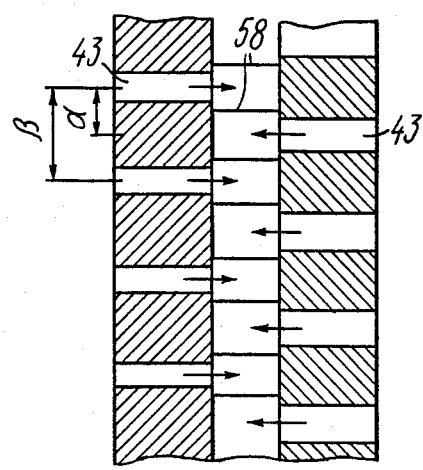
FIG. 27 is an enlarged developed view of the stator stacks with the stream deflector of FIG. 25.

The axial cooling channels 43 (FIG. 27) of the adjacent stator stacks 10 are displaced relative to each other by an angle $\alpha$ equal one half the angle $\beta$ between the axial cooling channels 43 in the same stator stack 10.

The provision of the stream deflector 57 as well as the mutual arrangement of the axial channels 43 in the adjacent stator stacks described above 10 makes it possible to eliminate mutual influence of the cooling agent flows in the adjacent stator stacks 10, thus decreasing the aerodynamic resistance of the space between the stator stacks 10.

The other elements of the electrical machine are similar to the elements shown in FIG. 20 and are designated by the same reference numerals. However, said elements can also be similar to the elements of the electrical machine shown in FIGS. 23 and 24.

In case of a multi-stack electrical machine, the stream deflectors 57 are equal in number to the nonmagnetic portions 3 of the housing 1.

Figure 28:
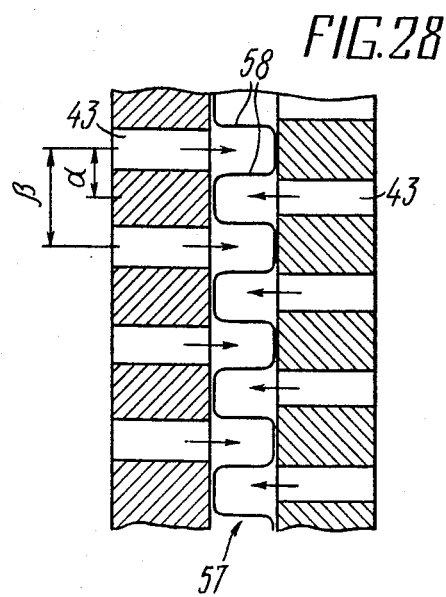
FIG. 28 is an enlarged developed view of the stator stacks with another embodiment of the stream deflector.

In still another embodiment shown in FIG. 28, the stream deflector 57 is a thin-walled ring corrugated in the shape of a meander. It is characterized by ease of its fabrication.

The longitudinal portions of the stream deflector 57 formed as a ring corrugated in the shape of a meander, form ribs 58.

According to still another embodiment, the ribs 58 (FIGS. 27, 28) are disposed underneath the ribs 45 (FIG. 26) or the ribs 55, 56 (not shown) of the nonmagnetic portion 3 of the housing 1.

Such a mutual arrangement of the ribs 58 of the stream deflector 57 and the ribs of the nonmagnetic portion 3 of the housing 1 reduces the aerodynamic resistance to the radially directed cooling flows, thus increasing the flow rate of the cooling agent and, hence, the efficiency of the electrical machine cooling.

The proposed electrical machine operates as follows.

The excitation system 14 (FIG. 1) induces in the electrical machine a magnetic flux which is closed through the magnetic circuit 16 of the excitation system 14, the magnetically conductive portions 2 of the housing 1, the stator stacks 10, the airgaps 8, the rotor pole systems 5, and the magnetic circuit 7 of the rotor 4. The nonmagnetic portion 3 arranged between the magnetically conductive portions 2 avoids by-passing of the magnetic flux.

Since the magnetic flux finds its way to the rotor 4 only through the pole projections 6 of the pole system 5, it penetrates at each instant of time only a part of the conductors of the stator winding 12, which is determined by the pole arc coefficient. The magnetic flux of one pole system 5 penetrates only one half the stator winding conductors if the pole arc coefficient reaches its maximum equal to 1.

As the rotor 4 rotates, its pole systems 5, moving with respect to the conductors of the stator winding 12, entrain the magnetic flux and cause its magnetic lines of force to cut the conductors of the stator winding 12.

By virtue of the fact that the rotor pole systems 5 (FIG. 2) are offset with respect to each other by 180° electrical, the electromotive force induced in the conductors of the stator winding 12 (FIG. 1) during the rotor rotation is only of the same sign.

When the electrical machine works as a generator, its operation completely corresponds to the generator regime of the synchronous alternating-pole machine, with the only difference that in this case an emf is induced only in a part of conductors of the winding 12 of one phase, laid in one of the stacks 10 of the stator 9. Because of this the efficiency of a like-pole machine will be as low as one half of that of the alternating-pole machine.

However, since the rotor 4 is free from the field winding, the rotor speed of such an electrical machine is far in excess of that of an alternating-pole machine carrying the field winding on the rotor body which is advantageous in drives requiring high rotational speeds.

Adjustment of the rotor speed by varying the magnetic flux is achieved by changing the current in the coil 15 of the excitation system 14.

The above electrical machine is characterized by natural cooling residing in that the heat liberated from the active parts of the machine is transmitted to the housing 1 and the end shield 13 and further to the environment.

The electrical machine with a greater number of the stator stacks 10 (FIG. 3) is similar in operation to the double-stack electrical machine (FIG. 1), with the difference that the magnetic flux developed by three coils 15 of the excitation system 14 is divided into three magnetic fluxes. The magnetic flux developed by only one coil 15 passes through the extreme stator stacks 10, while the magnetic flux developed by two coils 15 passes through the intermediate stator stacks 10. Therefore, the length of the extreme stator stacks 10 is to be cut in half as compared to the length of the intermediate stator stacks 10.

The electrical machine shown in FIGS. 7, 9, 10 operates in much the same way as the electrical machine shown in FIG. 1.

The operation of the electrical machine shown in FIGS. 11 through 14 is essentially similar to the operation of the electrical machine shown in FIG. 1, with the difference that the magnetic flux is developed by the permanent magnets 29, 30 which are to be connected in series into the magnetic network of the excitation system 14, the location of said magnets in the magnetic network of the excitation system 14 having no influence on the operation of the electrical machine. The arrangement of said magnets on the outer surface of the magnetically conductive portions 2 of the housing 1 results in simplification of the machine construction and leads to an increase in the surface of the magnets, defining the magnetic induction in the electrical machine.

Figure 16:
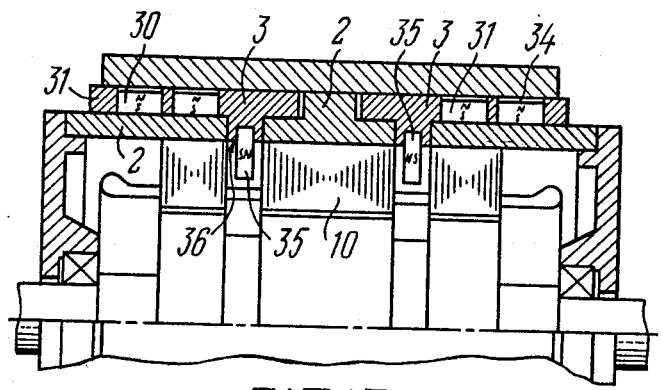
FIG. 16 is a sectional view taken longitudinally and illustrating an embodiment showing an electrical machine having three stator stacks and provided with permanent magnets axially magnetized and arranged between the stator stacks.

The electrical machine shown in FIG. 16 is similar in operation to the electrical machine shown in FIGS. 11 through 14, with the difference that the additional axially magnetized permanent magnets 35 develop a magnetic flux directed oppositely to the magnetic flux developed by the permanent magnets 29, 30 to reduce leakage fluxes developed by the magnetic system and close between the adjacent stator stacks 10 of opposite polarity.

The electrical machine shown in FIG. 20 is similar in operation to the electrical machine shown in FIG. 1, with the difference that it allows forced cooling of the machine active parts.

A cooling agent is supplied in oppositely directed flows through the openings 51 in the end shields 13 and, when passed through the axial cooling channels 43 of the stator stacks 10, come into contact with the portions featuring intensive heat release and disposed close to the coil-accommodating slots 11. The cooling agent, when passed between the stator stacks 10, reverses its direction from an axial to a radial one with the result that two oppositely directed flows merge into one flow entering the radial channels 46 for cooling the housing 1.

The movement of the cooling agent is shown in the drawings by arrows.

The coils 15 of the excitation system 14 arranged on opposite sides from the nonmagnetic portion 3 of the housing 1 ensure free exit of the cooling agent through the radial cooling channels 46, thus decreasing their aerodynamic resistance and increasing the cooling efficiency of the electrical machine.

Thus, the provision of axial and radial cooling of the electrical machine with a double amount of the cooling agent enables loads upon the machine's active parts to be essentially increased, while improving specific characteristics of the electrical machine and its operating reliability.

However, the oppositely directed flows of the cooling agent, merging into one flow, mutually neutralize the flow rate of the cooling agent which leads to a decreased cooling efficiency of the electrical machine.

The above disadvantage is eliminated in the electrical machine shown in FIG. 25 wherein the axial cooling channels 43 of one of the stator stacks 10 are displaced with respect to the channels 43 of the adjacent stator stack 10 by an angle α and the stream deflector 57 is mounted between the stator stacks 10.

Therefore, the oppositely directed flows of the cooling agent are displaced with respect to each other, separated from one another by the ribs 58 of the stream deflector 57 (FIGS. 27, 28) and are supplied to different radial cooling channels 46 (FIG. 26) for cooling the nonmagnetic portion 3 of the housing 1, thus ensuring uniform cooling of the coil 15 of the excitation system 14.

Moreover, the arrangement of the ribs 58 (FIGS. 27, 28) underneath the ribs 45 (FIG. 26) of the nonmagnetic portion 3 of the housing 1 provides free exit of the cooling agent from the radial channels 46, thus raising the cooling agent flow rate and improving the cooling efficiency of the electrical machine.

Although the particular embodiments of the invention have been described hereinabove, it will be apparent to those skilled in the art that numerous modifications and other embodiments of the invention may be devised without departing from the true spirit and scope thereof.

The proposed electrical machine is simple in design and easy to assembly owing to the independent fabrication of its stator and the excitation system, which, in turn, leads to an improved maintainability of the electrical machine since there is no need of disassembling the whole electrical machine in case of the failure of the excitation system.

In the proposed construction the rotor length is found to be decreased at the expense of the decreased spacing between the stator stacks, which, in turn, improves the strength and stiffness of the rotor and, therefore, provides a possibility of raising the critical rotational speed of the electrical machine as a whole.

Furthermore, the proposed electrical machine provides forced cooling of the active parts by axial and radial flows, thus enabling loads upon the machine active parts to be increased while upgrading its specific characteristics and improving the operating reliability of the machine.

The present invention can most advantageously be used in high-speed electric drives for turbo-compressors, high-pressure pumps, and high-speed wire-rolling mills.

What is claimed is:

1. An electrical machine with a housing comprising: cylindrical magnetically conductive portions; a cylindrical non-magnetic portion shaped like a double-T beam in an axial section and said double-T beam having an outer flange and an inner flange connected with said magnetically conductive portion of said housing; a rotor mounted within said housing and having at least two pole systems having pole projections, said pole systems interconnected by a magnetic circuit means; a stator mounted within said housing and having at least two stacks of laminations, each of said stator stacks being secured to one of said magnetically conductive portions, and said stator stacks being equal in number to said magnetically conductive portions; and an excitation system connected to said outer flange of said double T-beam mounted on the outside of said housing and including a coil which is disposed between said inner and outer flanges of the double-T beam on both sides of a crosspiece and an outer magnetic circuit in the form of a ring of U-shaped sections composed of at least two portions interconnected in a radial direction by means of a detachable joint which encloses said coil and adjoins said magnetically conductive portions of said housing.

2. An electrical machine according to claim 1, wherein each of said flanges of said double-T beam is shaped like a ring, both rings being arranged coaxially.

3. An electrical machine according to claim 2, which further comprises an axial cooling channel provided in said stator stacks, wherein said flanges of said double-T beam are made in the form of ribs rigidly connected with the surface of said cross-piece and spaced along the periphery to form radial cooling channels of said housing.

4. An electrical machine according to claim 3, wherein said nonmagnetic portion of said housing is built up of plates spaced along the periphery to form radial cooling channels of said housing.

5. An electrical machine according to claim 3, which further comprises a stream deflector arranged between said stator stacks, said axial cooling channels of the stator stacks are displaced with respect to each other by an angle equal to one half the angle between said axial cooling channel of the same stator stack.

6. An electrical machine according to claim 5, wherein said stream deflector comprises ribs spaced along the periphery and secured to said nonmagnetic portion of said housing.

7. An electrical machine according to claim 5, wherein said stream deflector is a thin-wall ring corrugated in the shape of a meander.

8. An electrical machine according to claim 6, wherein said ribs of said stream deflector are disposed underneath stiffening ribs of said nonmagnetic portion of said housing.

* * * * *